US006956477B2

(12) United States Patent
Chun

(10) Patent No.: US 6,956,477 B2
(45) Date of Patent: Oct. 18, 2005

(54) MULTICHANNEL IMAGE PROCESSOR AND SECURITY SYSTEM EMPLOYING THE SAME

(75) Inventor: Doo-hwan Chun, Yongin (KR)

(73) Assignee: Samsung Electronics Co., Ltd., Suwon-si (KR)

(*) Notice: Subject to any disclaimer, the term of this patent is extended or adjusted under 35 U.S.C. 154(b) by 271 days.

(21) Appl. No.: 10/083,484

(22) Filed: Feb. 27, 2002

(65) Prior Publication Data

US 2003/0011678 A1 Jan. 16, 2003

(30) Foreign Application Priority Data

Jul. 14, 2001 (KR) ................................. 2001-0042645

(51) Int. Cl.[7] ............................................. G08B 13/00
(52) U.S. Cl. ............. 340/541; 340/286.01; 340/286.02; 348/154
(58) Field of Search ................. 340/541, 545.2, 340/545.3, 545.4, 545.9, 550, 286.01, 286.02; 348/42, 43, 143, 154, 155, 159

(56) References Cited

U.S. PATENT DOCUMENTS

| 5,382,943 A | | 1/1995 | Tanaka .................. 340/539.22 |
| 5,557,553 A | * | 9/1996 | Sellie, Sr. .................... 702/176 |
| 5,576,757 A | | 11/1996 | Robert et al. .......... 340/539.22 |
| 5,745,126 A | * | 4/1998 | Jain et al. .................... 382/154 |
| 6,069,655 A | * | 5/2000 | Seeley et al. ............... 348/154 |
| 6,097,429 A | * | 8/2000 | Seeley et al. ............... 348/154 |
| 6,297,844 B1 | * | 10/2001 | Schatz et al. ................. 348/43 |
| 6,504,479 B1 | * | 1/2003 | Lemons et al. ............. 340/541 |
| 6,507,278 B1 | * | 1/2003 | Brunetti et al. ............. 340/541 |
| 6,717,611 B2 | * | 4/2004 | Bartolotta et al. .......... 348/159 |

FOREIGN PATENT DOCUMENTS

TW 436745 5/2001

OTHER PUBLICATIONS

"Rejection Decision" issued by Taiwanese Patent Office dated on Sep. 5, 2003.

* cited by examiner

Primary Examiner—Van T. Trieu
(74) Attorney, Agent, or Firm—Robert E. Bushnell, Esq.

(57) ABSTRACT

A security system has: a multichannel image processor for selectively receiving image signals transmitted through a plurality of input channels and for outputting the image signals; and a user's computer connected with the multichannel image processor through a communication interface, the user s computer controlling channel selection of the multichannel image processor in accordance with a set-up mode, displaying signals inputted from the multichannel image processor through a display device corresponding to the set-up mode and/or record in a memory, supplying a main image display window for displaying the transmitted image signals and a manipulation key window for displaying keys for selecting the mode to be integrally displayed on a main frame, and having a multichannel image driver to process in accordance with the selected key. In the multichannel image processor and the security system employing the same, if the recording medium storing a multichannel image driver is installed in a computer, and the multichannel image processor is installed in a camera and the computer, a desired security system can be established, and thus the utility of resources will be increased. Moreover, a separate job can be performed using the computer while watching an object, and the camera can be remotely controlled.

34 Claims, 11 Drawing Sheets

FIG.12A

– NTSC

| CATEGORY | | | RECORDING CAPACITY BY TIME | | | | NUMBER OF DAYS FOR RECORDING (30GB BASIS) |
|---|---|---|---|---|---|---|---|
| | | | 1 Min | 1 Hour | 24 Hour | | |
| CASE OF MUCH MOVEMENT (5Kbyte/frame) | Real Time | 30frames/sec | 9MB | 540MB | 13GB | | 2.3일 |
| | | 20frames/sec | 6MB | 360MB | 8.6GB | | 3.5일 |
| | Non Real Time | 10frames/sec | 3MB | 180MB | 4.3GB | | 7일 |
| | | 5frames/sec | 1.5MB | 90MB | 2.2GB | | 13.6일 |
| CASE OF LESS MOVEMENT (2Kbyte/frame) | Real Time | 30frames/sec | 3.6MB | 216MB | 5.2GB | | 5.8일 |
| | | 20frames/sec | 2.4MB | 144MB | 3.5GB | | 8.6일 |
| | Non Real Time | 10frames/sec | 1.2MB | 72MB | 1.7GB | | 17.6일 |
| | | 5frames/sec | 0.6MB | 36MB | 0.9GB | | 33.3일 |

FIG.12B

- PAL

| CATEGORY | | | RECORDING CAPACITY BY TIME | | | NUMBER OF DAYS FOR RECORDING (30GB BASIS) |
| --- | --- | --- | --- | --- | --- | --- |
| | | | 1 Min | 1 Hour | 24 Hour | |
| CASE OF MUCH MOVEMENT (5Kbyte/frame) | Real Time | 25frames/sec | 7.5MB | 450MB | 10.8GB | 2.8일 |
| | | 15frames/sec | 4.5MB | 270MB | 6.5GB | 4.6일 |
| | Non Real Time | 10frames/sec | 3MB | 180MB | 4.3GB | 7일 |
| | | 5frames/sec | 1.5MB | 90MB | 2.2GB | 13.6일 |
| CASE OF LESS MOVEMENT (2Kbyte/frame) | Real Time | 25frames/sec | 3MB | 180MB | 4.3GB | 7일 |
| | | 15frames/sec | 1.8MB | 108MB | 2.6GB | 11.5일 |
| | Non Real Time | 10frames/sec | 1.2MB | 72MB | 1.7GB | 17.6일 |
| | | 5frames/sec | 0.6MB | 36MB | 0.9GB | 33.3일 | ns
MULTICHANNEL IMAGE PROCESSOR AND SECURITY SYSTEM EMPLOYING THE SAME

CLAIM OF PRIORITY

This application makes reference to, incorporates the same herein, and claims all benefits accruing under 35 U.S.C. §119 from my application MULTICHANNEL IMAGE PROCESSOR AND SECURITY SYSTEM EMPLOYING THE SAME filed with the Korean Industrial Property Office on Jul. 14, 2001 and there duly assigned Serial No. 42645/2001.

BACKGROUND OF THE INVENTION

1. Technical Field

The present invention relates to a multichannel image processor and a security system employing the same, and more particularly to a multichannel image processor capable of displaying signals transmitted from a plurality of security cameras after selectively receiving signals and recording the signals, and the security system employing the same.

2. Related Art

A security system employing a switching unit can display, record and reproduce images by selectively receiving transmitted images from a plurality of cameras installed to photograph an inside or an outside of a building that must be watched.

The security system employing a switching unit has been used because such a security system has some advantageous aspects such as reducing manpower needed to watch a building, or providing recorded information of an object. However, it requires special equipment that is expensive, inconvenient, and inflexible.

I have found that there is a need for a new security system that utilizes the resources of a computer to provide improved flexibility, convenience, and affordability.

SUMMARY OF THE INVENTION

The present invention has been made to overcome the above-mentioned problems of the related art. Accordingly, it is an object of the present invention to provide a multichannel image processor and a security system employing the same capable of increasing the utility of resources by using resources of a computer so that the computer can support watching and recording an object, and mitigating the limit of the space needed for installing.

Another object of the present invention is to provide a multichannel image processor and a security system employing the same capable of remote controlling the movement of a camera from a user's computer, and setting up a function supported from the camera.

The security system employing the multichannel image processor includes: a multichannel image processor for selectively receiving image signals transmitted through a plurality of input channels and outputting the image signals; and a user's computer connected with the multichannel image processor through a communication interface. The user's computer is for controlling a channel selection of the multichannel image processor in accordance with a set-up mode, displaying signals input from the multichannel image processor through a display device corresponding to the set-up mode and/or record in a memory, supplying a main image display window for displaying the transmitted image signals and a manipulation key window for displaying keys for selecting the mode to be integrally displayed on a main frame, and having a multichannel image driver to process in accordance with a selected key.

Preferably, the multichannel image processor has: a plurality of memories for storing signals input through the plurality of input channels, respectively; a memory controller for selectively outputting the signals stored in the plurality of memories in accordance with a control signal; a coding unit for coding the signals output from the plurality of memories and transmitting the coded signals to the user's computer; and a main controller for controlling the memory controller in accordance with the control signal transmitted from the user's computer.

The multichannel image processor further comprises a plurality of A/D converters disposed respectively between each of the plurality of input channels and each of the plurality of memories in order to convert the input signals into digital signals.

The multichannel image processor further comprises a multiplexer for multiplexing the signals input through the plurality of input channels and outputting the multiplexed signals via a terminal for an external displayer.

The multichannel image processor further comprises an alarm sensor for sensing an abnormality of an object to be watched, wherein the main controller transmits received information of an abnormality signal to the multichannel image driver when the abnormality signal is transmitted, and operates an alarm channel selection mode corresponding to the abnormality signal under a control of the multichannel image driver.

The multichannel image driver records and displays image signals of a corresponding camera for a predetermined time when the abnormality signal is transmitted. Preferably, more than one photographing apparatus is connected with the plurality of input channels, the photographing apparatus being capable of controlling a photograph direction thereof in accordance with a control signal, wherein the multichannel image driver has basic photograph keys disposed on the manipulation key window in order to manipulate functions supported by the photographing apparatus, and controls the photographing apparatus through the multichannel image processor so as to correspond to the manipulation of the basic photograph keys. The basic photograph keys include a focus adjust key, a zoom in/out adjust key, and a photograph direction manipulation key. The zoom in/out adjust key can be referred to as a zoom adjust key.

It is more preferable that the photograph direction manipulation keys are displayed as a mark having a predetermined shape on an initial point in a direction display window for displaying direction guide information for guiding a photograph adjust direction when the photograph direction manipulation key is not selected, and the multichannel image driver displays the mark after moving the mark in the direction display window in accordance with a dragging direction of a mouse clicked to select the mark, outputs a rotation control signal through the multichannel image processor to the photographing apparatus in order to rotate the photographing apparatus according to the moving direction, and displays the mark to be returned to the initial point when the click is released.

The next menu key is provided for selecting to see a succeeding frame for offering a detailed photograph key capable of adjusting and setting up a detailed function including a photographing pattern of the photographing apparatus, and such key is provided on the manipulation key window, and when the next menu key is selected, the multichannel image driver loads and displays the succeeding frame on the display device and processes a function corresponding to the selected detailed photograph key.

The detailed photograph key includes menu keys capable of selecting and setting up an identifier for each camera, a white balance, a setter speed, and motion detection. More preferably, the detailed photograph key comprises: a preset key for selecting a mode in which the photographing apparatus operates according to set-up information with respect to a region corresponding to one of ordered numbers among the ordered number of preset set-up information, the preset set-up information having been classified selectively by assigning the ordered numbers to respective detailed regions thereof according to an azimuth angle; a manipulation pattern operation key for operating the photographing apparatus in accordance with stored information about the manipulation of the basic photograph direction manipulation key manipulated by a user; and a scan key for operating the photographing apparatuses to consecutively photograph so as to correspond to the preset set-up information in accordance with the ordered number.

The detailed photograph manipulation key comprises: an auto pan key for driving a pan within a set-up pan angle; and a block set-up key for setting up an object, the movement of which with respect to image information displayed on the image display window is to be detected by appointing a block for some region in the image display window.

Moreover, a memory capacity display window is disposed at a side of the main frame in order to display a memory capacity, wherein the multichannel image driver calculates remaining memory capacity of the user's computer and displays the remaining memory capacity through the memory capacity display window.

A system set-up key is disposed on the manipulation key window. The multichannel image driver loads a set-up module window for supporting the set up of a system when the system set-up key is selected on the display device. The set-up module window includes a window capable of selecting a directory for storing the received image in a memory of the user's computer, and an alarm capacity selection window capable of setting up a remaining capacity alarm target value to generate an alarm signal when the remaining memory capacity of the memory reaches a set-up value.

A separation key is disposed in the main frame in order to load a separated image window for displaying a transmitted image separated from the main image window. The multichannel image driver displays an image corresponding to a display mode by loading a separated image window when the separation key is selected, and displays after adjusting a size of the separated image window and the image corresponding to the received signal when a signal for manipulating the size of the separated image window through an input device is received.

It is preferable that the user's computer include the multichannel image driver and a window operating system for supporting multi-tasking for operating an application program stored in a memory, and that the multichannel image driver be supported by the window operating system.

To achieve these and other objects in accordance with the principles of the present invention, as embodied and broadly described, the present invention provides a security system, comprising: a multichannel image processor for selectively receiving image signals transmitted through a plurality of input channels and for outputting the image signals; and a computer connected with said multichannel image processor through a communication interface, said computer having a multichannel image driver, said computer inputting the image signals outputted from said multichannel image processor; the multichannel image driver controlling selection of at least one of the input channels in accordance with a selected set-up mode, supplying a main image display window displaying the inputted image signals to a main frame of a display device, supplying at least one manipulation key window displaying keys to the main frame of the display device, processing in accordance with the selected set-up mode, performing at least one of displaying the inputted image signals through the display device in accordance with the selected set-up mode and recording the inputted image signals in a memory in accordance with the selected set-up mode, the displayed keys being provided for the purpose of selecting the set-up mode and other modes, the main image display window and the at least one manipulation key window being integrally displayed on the main frame of the display device.

To achieve these and other objects in accordance with the principles of the present invention, as embodied and broadly described, the present invention provides a multichannel image processor, comprising: a plurality of input channels for receiving image signals transmitted from a plurality of cameras; a plurality of memories for storing the image signals received by said plurality of input channels; a memory controller for selectively outputting the image signals, stored in said plurality of memories, in accordance with a control signal; a coding unit for coding signals outputted from said plurality of memories, and for transmitting the coded signals through an image output terminal for a computer; and a main controller for controlling said memory controller in accordance with the control signal, the control signal being transmitted from the computer through a computer data communication terminal.

To achieve these and other objects in accordance with the principles of the present invention, as embodied and broadly described, the present invention provides an apparatus installed in a computer, comprising: a receiver disposed in the computer to receive signals transmitted to the computer from an external device; and a multichannel image driver for outputting a channel selection signal to the external device through a set-up port according to a set-up mode, for displaying the signals inputted through said receiver on a display device, for recording the signals inputted through said receiver in a memory in accordance with the set-up mode for displaying a main image display window, the main image display window displaying together on a main frame the signals inputted through said receiver, and a manipulation key window displaying keys for selecting a mode, and for processing, in accordance with a selected key, the selected key being one of the keys displayed by the manipulation key window.

To achieve these and other objects in accordance with the principles of the present invention, as embodied and broadly described, the present invention provides a computer storage medium having stored thereon a set of instructions implementing a method, said set of instructions comprising one or more instructions for: selectively receiving image signals transmitted through a plurality of input channels and outputting the image signals; and controlling a selection of at least one of the input channels in accordance with a selected set-up mode, displaying the outputted image signals in a main image display window of a display device of a computer in accordance with the selected set-up mode, displaying signals stored in a memory, supplying at least one manipulation key window displaying keys for selecting the set-up mode and other modes, controlling said selective receiving of the image signals in accordance with the selected set-up mode, the main image display window and the manipulation key window being integrally displayed on a main frame of the display device.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

FIG. 12A is a view showing memory capacity consumed when image data is recorded into a record devices using a National Television Standards Committee (NTSC) methods by a multichannel image driver of FIG. 6 for a transmitted image; and FIG. 12B is a view showing the memory capacity consumed by time when image data is recorded into a record devices using a phase alternating line (PAL) methods by the multichannel image driver of FIG. 6 for the transmitted image.

DETAILED DESCRIPTION OF PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. It will be appreciated that, in the development of any actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure. Additionally, the embodiments disclosed can be combined, in accordance with the principles of the present invention, to form an embodiment that enhances the benefits of the present invention.

Figure 1:
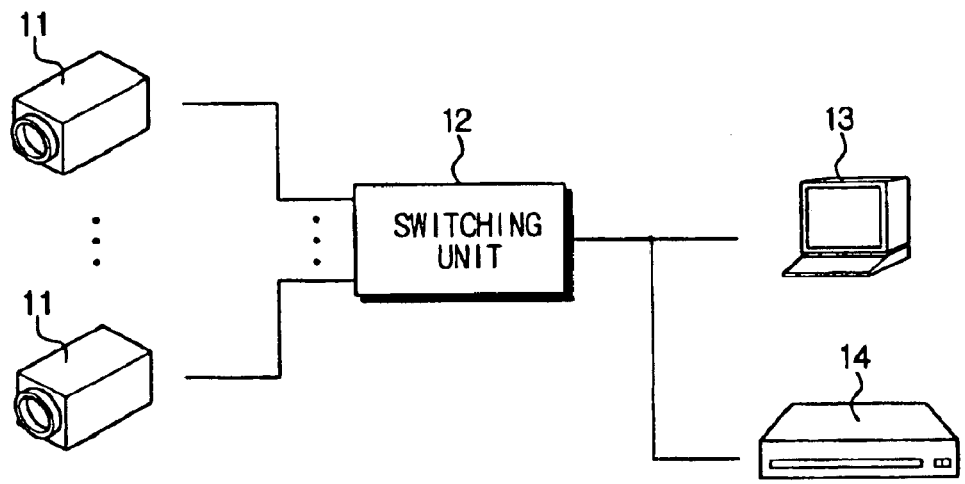
FIG. 1 is a view showing a security system employing a switching unit.

FIG. 1 is a view showing a security system employing a switching unit. Referring to FIG. 1, the security system employing the switching unit comprises a plurality of security cameras 11, a switching unit 12, a monitor 13, and a recorder/reproducer 14.

The switching unit 12 selectively receives image signals transmitted from the plurality of security cameras 11 in accordance with a sequence of set up, and outputs the image signals. The monitor 13 displays the image signals transmitted from the switching unit 12, and the recorder/reproducer 14 records the images received through the switching unit 13 into a recording medium. The recorder/reproducer 14 has a plurality of keys to set up recording and playing the images recorded in the recording medium.

This security system employing the switching unit is established by contacting the switching unit 12 and the recorder/reproducer 14, which are exclusively used for the security system employing the switching unit, to the monitor 13 and the security cameras 11. However, each product is expensive because they are supplied to be exclusively used only for the security system. Thus, only some users, who have a greater need to watch and secure the building that justifies the expenses for installing the system, purchase the security system. Consequently, it is difficult to lower the cost needed to establish the security system employing the switching unit, and the cost has become an obstacle to obtain a plentiful supply of users.

Most office-working environments have been changed to use computers for accomplishing jobs, and also the use of computers, which enable Internet communication at home, has been widely increased. Yet, if the monitor 13 and the recorder/reproducer 14, among the security systems:, are installed in a working place with electric devices, the practical usage rate is deteriorated, since some places for installing the devices should be allocated there. Moreover, when using other devices, the devices might have to be moved to change their positions.

Figure 2:
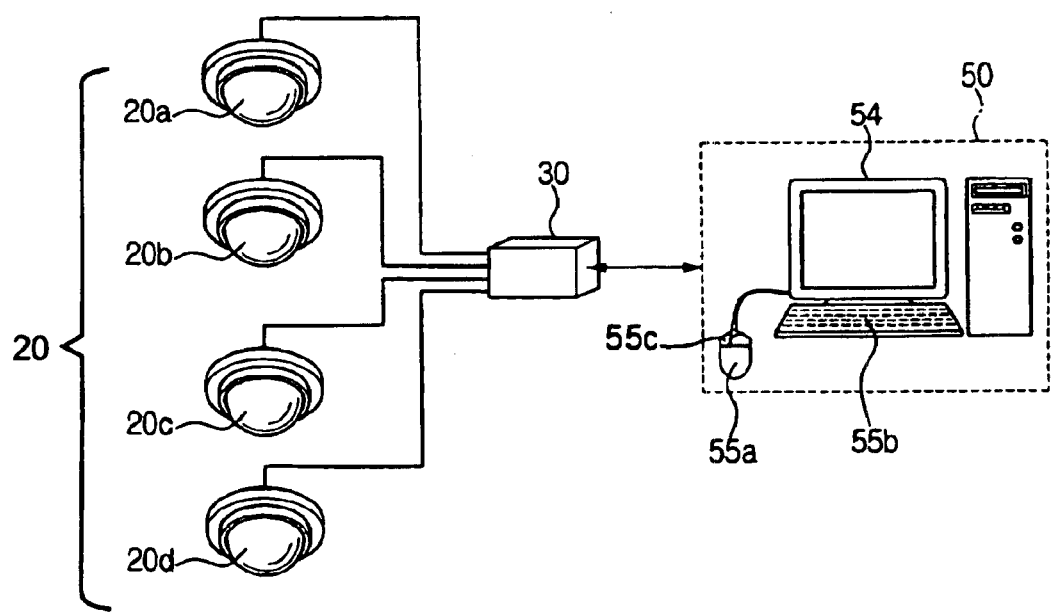
FIG. 2 is a view showing a security system employing a multichannel image processor, in accordance with the principles of the present invention.

Hereinbelow, the preferred embodiment of the present invention will be described in great detail by referring to the appended drawings. FIG. 2 is a view schematically showing a security system employing a multichannel image processor, in accordance with the principles of the present invention.

Referring to FIG. 2, the security system includes a multichannel image processor 30 and a user's computer 50. The computer 50 includes monitor 54, keyboard 55*b*, and mouse 55*a*. The multichannel image processor 30 is connected between a plurality of cameras 20 for photographing and the user's computer 50.

The multichannel image processor 30 selectively processes signals transmitted from the plurality of cameras 20 in accordance with a control signal transmitted from the user's computer 50, transmits the processed signals to the users' computer 50, and controls driving of the plurality of cameras 20. Preferably, the multichannel image processor 30 is one piece to be installed outside.

Moreover, it is preferable that the multichannel image processor 30 have separated input channels for receiving input signals and channels for communicating data to control the plurality of cameras 20 in regard to the plurality of cameras 20. A wireless communication or a communication by wire can be used for the data communication, and it is preferable that the data communication by wire applies an RS-485 interface mode, which has a small decay rate for a long distance.

Figure 3:
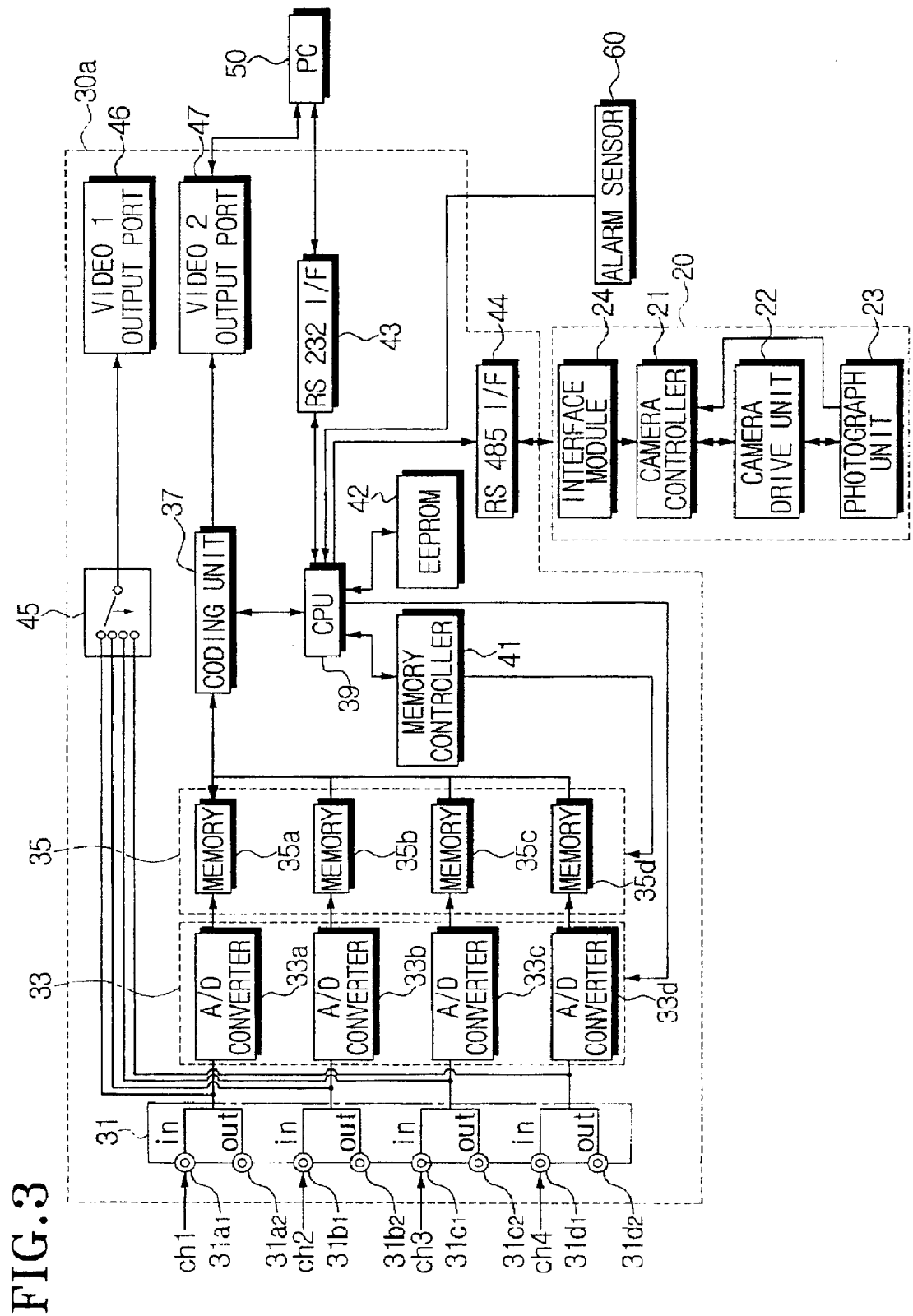
FIG. 3 is a block diagram showing one preferred embodiment of a multichannel image processor of FIG. 2.

A more detailed description will be given hereinafter by referring to FIG. 3. FIG. 3 is a block diagram showing one preferred embodiment of the multichannel image processor of FIG. 2 according to the present invention. Referring to FIG. 3, the multichannel image processor 30a has an input channel port 31, a plurality of analog-to-digital (A/D) converters 33, a coding unit 37, a central processing unit (CPU) main controller 39, a memory controller 41, an RS-232 interface (I/F) module 43, arid an RS-485 interface (I/F) module 44.

The input channel port 31 has a plurality of input channels 31a1, 31b1, 31c1, and 31d1 disposed therein in order to receive signals transmitted from the plurality of cameras 20a, 20b, 20c and 20d.

Preferably, input channels (IN) 31a1, 31b1, 31c1, and 31d1 have output terminals (OUT) 31a2, 31b2, 31c2, and 31d2, respectively, which are branched off from the input channels 31a1, 31b1, 31c1, and 3d1, respectively, to output the image signals transmitted from the cameras 20a, 20b, 20c and 20d, respectively, as signals for separate apparatuses by branching off the signals. Reference characters Ch1 through Ch4 are given for more convenient description of the image output lines of cameras 20a, 20b, 20c, and 20d, respectively.

Only four input channels 31a1, 31b1, 31c1, and 31d1 are shown to avoid the complication of the figure, but the number of input channels can be extended. The A/D converters 33a, 33b, 33c, and 33d are disposed for each input channel 31a1, 31b1, 31c1, and 31d1, and convert transmitted analog signals into digital signals. The A/D converters 33 can be omitted when the multichannel image processor 30a supports a digital camera.

The memories 35a, 35b. 35c and 35d (FIG. 3) temporarily store the image signals transmitted from the input channels corresponding to each input channel 31a1, 31b1, 31c1, and 31d1. The memories 35a, 35b, 35c and 35d can be called frame buffers.

The memory controller 41 selectively controls the memories 35a, 35b, 35c and 35d in accordance with a channel control signal, and outputs memory data to the coding unit 37. In other words, if there is a four-division display mode, the memory controller 41 controls the memories 35a, 35b, 35c and 35d so that the data transmitted to the memory of each channel can be consecutively outputted for each frame, and if there is a single mode, the memory controller 41 controls the memories 35a, 35b, 35c and 35d to continuously output only the data transmitted to the memory of a selected channel or selected channels.

The coding unit 37 encodes the image signals output from the selected memory 35a, 35b, 35c or 35d, and outputs the coded signals through a video 2-output port 47, which is an image output terminal for the user's computer 50. The encoding method of the coding unit 37 can be any of various methods. For example, it can be a method of separating the data for colors and encoding the data.

A multiplexer 45 is disposed between each input channel 31a1, 31b1, 31c1, and 31d1 and video 1-output port 46 in order to consecutively switch the input channel 31a1, 31b1, 31c1, and 31d1 in accordance With a set-up order. The video 1-output port 46 is a terminal for transmitting an image generated by being switched in turn between channels by the multiplexer 45, to another external apparatus or display unit (not shown) different from the users computer 50. Therefore, the video 1-output port 46 can be used when the user wants to divide the image transmitted from the plurality of cameras 20b, 20c and 20d into four on a screen of the display device in a working environment different from the users computer 50.

An alarm sensor 60 can be any kind of device for sensing an abnormality in the region of the object to be watched by the cameras 20a, 20b, 20c and 20d. For example, a contacting or non-contacting sensor for sensing the opening/closing of a door, a heat sensor using a heat sensing method for sensing the entrance of a person, a motion sensor for detecting motion of a person, and a piezo-electric sensor for sensing damage or shock by being attached to a window can be applied as the alarm sensor 60. In addition, an infrared sensor, a magnetic sensor, etc. can be applied as the alarm sensor 60 according to the type of object being watched.

A user can utilize the present invention to designate (or select) one or more cameras to be associated with a particular alarm sensor. Then, when that particular alarm sensor is activated, video images from the designated camera or cameras can be automatically recorded and displayed. The location of the designated camera(s) is independent of the location of the alarm sensor. Thus, the designated camera(s) can be physically near the region of the alarm sensor, or the designated camera(s) can be physically distant from the region of the alarm sensor.

For example, if a first alarm sensor is set to detect when an important door opens, a user can select three cameras to be associated with an alarm signal from that first alarm sensor. The three cameras could include a first camera positioned to allow a user to view a front side of the important door, a second camera positioned to allow the user to view a back side of the important door, and a third camera positioned to allow the user to view any people who travel down a hallway that is near a room with valuable items, where the hallway is 100 meters from the important door. In response to the alarm signal from the first alarm sensor, image signals from those three cameras can be sequentially recorded, or displayed, or recorded and displayed, for a predetermined amount of time.

Generally, in accordance with the principles of the present invention, one alarm sensor is used for one camera, and thus one alarm sensor is associated with one and only one camera. However, as in the example described above, multiple cameras can be designated to be associated with a single sensor, in accordance with the principles of the present invention. Thus, the present invention can be set up to have five cameras (numbered 1 through 5) and ten alarm sensors (numbered 1 through 10), for example. Here, the camera number 2, the camera number 4, and the camera number 5 can be set to correspond to the alarm sensor 7, for example. When the alarm sensor 7 is activated, the images viewed by cameras 2, 4, and 5 can be sequentially displayed and recorded in the following order: camera 2→camera 4→camera 5→camera 2→camera 4→camera 5→camera 2→camera 4 and so on.

If an abnormality signal is transmitted from the alarm sensor 60, the main controller 39 transmits the received abnormality signal information to the user's computer 50, and controls the memory controller 41 so that a channel can be selected in correspondence to an alarm channel select mode replied forwarded from the users computer 50 for the generation of the abnormality signal.

The RS-232 interface module 43 communicates data between the main controller 39 and the user's computer 50, and comprises a computer data communication terminal for connecting. The RS-485 interface module 44 supports data communication for controlling the operation of the cameras 20 connected to the main controller 39 through the input channels 31a1, 31b1, 31c1, and 31d1, respectively. The RS-485 interface module 44 has a camera communication terminal.

Reference numeral 42 identifies an electrically erasable programmable read only memory (EEPROM) having various data including a starting program. The cameras 20 comprise an interface module 24, a camera controller 21, a camera drive unit 22, and a photograph unit 23.

The photograph unit 23 converts the signals photographed through a lens into electric image signals, and transmits the electric image signals through camera controller 21 to one input channel selected among the plurality of input channels 31a1, 31b1, 31c1, and 31d1.

The camera drive unit 22 can drive the photograph unit 23 in correspondence to supported functions such as pan, tilt, and zoom in/out, and controls the driving of the photograph unit 23 according to a control signal input from the RS-485 interface module 44 through the camera controller 21. In the preferred embodiment of the present invention, to avoid complication of the figure, only one camera 20 is shown as connected to the RS-485 interface module 44, but a plurality of cameras 2C can be connected in parallel with the RS-485 interface module 44, and the communication with the set-up cameras 20 is performed by using an identifier which is different for each camera.

When a camera can zoom in/out, this indicates that the camera can zoom in and can zoom out. A zoom operation can include a zoom-in function or a zoom-out function, or one of those two functions followed by the other. When a camera performs a zoom in/out, the camera can be said to be performing a zoom operation.

The cameras 20 communicate data through the RS-485 interface module 44, and the photographed image signals are transmitted to the input channel port 31 through a separate output terminal.

On the other hand, the multichannel image processor 30a can be constructed to perform wireless communication with the cameras 20 in contrast to the wired communication method using the RS-485 interface module 44.

Figure 4:
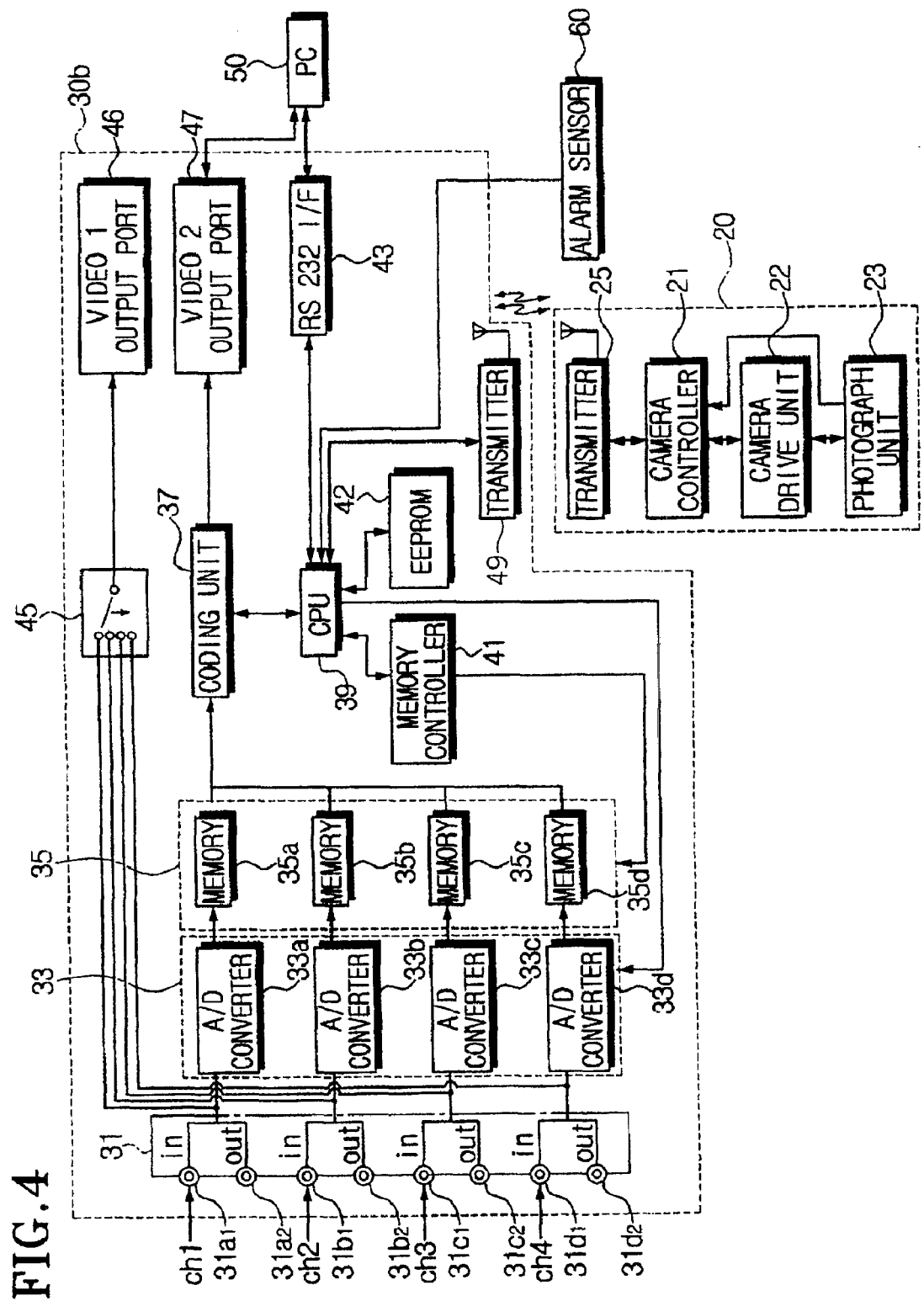
FIG. 4 is a block diagram showing another preferred embodiment of a multichannel image processor of FIG. 2.

FIG. 4 is a block diagram showing another preferred embodiment of the multichannel image processor of FIG. 2 according to the present invention. Elements having the same functions as elements shown in FIG. 3 are given the same reference numerals.

The multichannel image processor 30b comprises a wireless transmitter 49 for communicating data between the main controller 39 and the cameras 20. Moreover, the cameras 20 also have a wireless transmitter 25. According to the above construction, the multichannel image processor 30b can wirelessly control the movement of the cameras 20. A different embodiment of the image processor of FIG. 2 has the wireless capabilities of FIG. 4 and also the non-wireless capabilities of FIG. 3. The user's computer 50 is established with the usual computer hardware.

Figure 5:
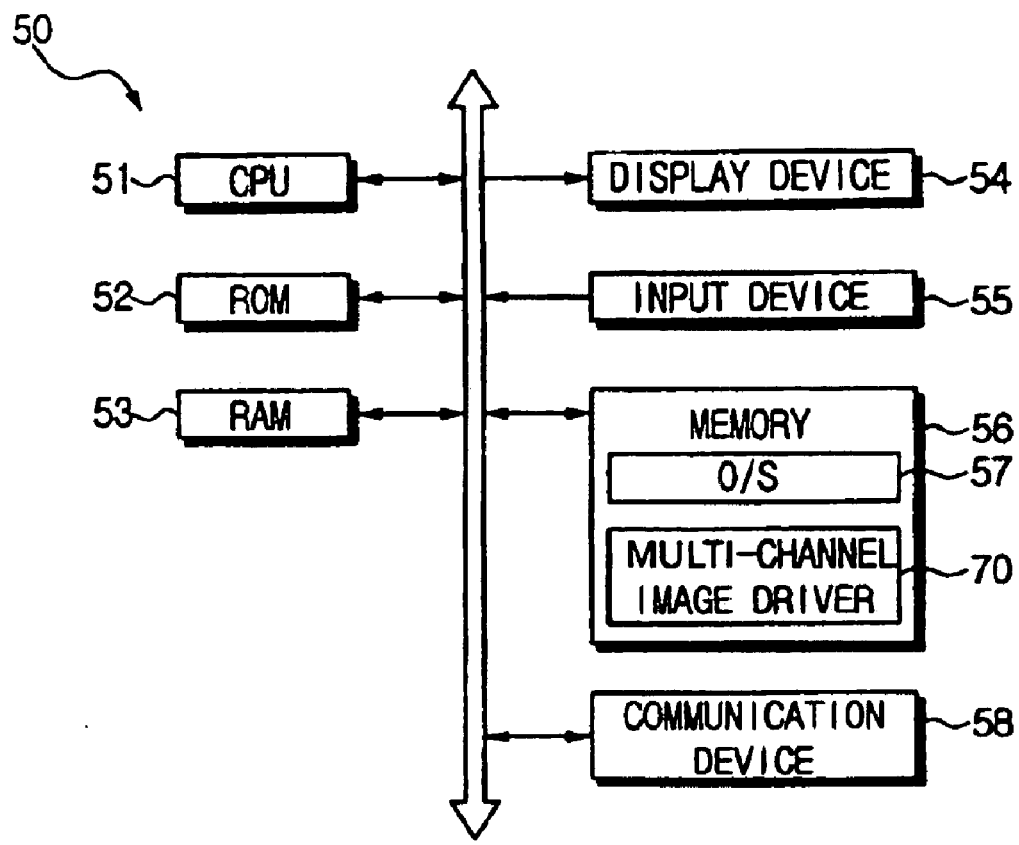
FIG. 5 is a block diagram showing the user's computer of FIG. 2.

FIG. 5 is a block diagram showing the user's computer 50 of FIG. 2 in more detail. Referring to FIG. 5, the user's computer 50 has a central processing unit (CPU) 51, a read only memory (ROM) 52, a random access memory (RAM) 53, a display device 54, an input device 55, a memory 56, and a communication device 58.

The input device 55 includes a mouse 55a and/or a keyboard 55b (see FIG. 2). The communication device 58 includes an RS-232 interface module (not shown) for serial communication.

An image signal input end (not shown) of the user's computer 50 receives image signals from the video 2 output port 47 of the multichannel image processor 30a or 30b. It is preferable that a video graphic adaptor (VGA) card (not shown) be used for processing those image signals.

An operating system (O/S) 57 for supporting a window system, such as Microsoft Windows 98, window Microsoft Windows 2000, or LINUX, is disposed in the memory 56. A multichannel image driver 70, which is an application program for image security, is installed in the memory 56.

The multichannel image driver 70 is programmed to process the signals transmitted from the plurality of cameras 20 as a result of support from the operating system 57, and controls the multichannel image processor 30 and the cameras 20 in a window system. The multichannel image driver 70 can be offered in a form recorded on a recording medium, so that the multichannel image driver 70 can be installed in a user's computer as desired.

The computer 50 uses a windows-based operating system. Some examples of windows-based operating systems include Microsoft Windows 95, 98, ME, NT, 2000, and XP. However, this invention is not limited to computers using Microsoft operating systems. There are windows-based operating systems other than Microsoft Windows operating systems. For example, Apple Computer has utilized a windows-based operating system for Apple's Macintosh computer.

Figure 6:
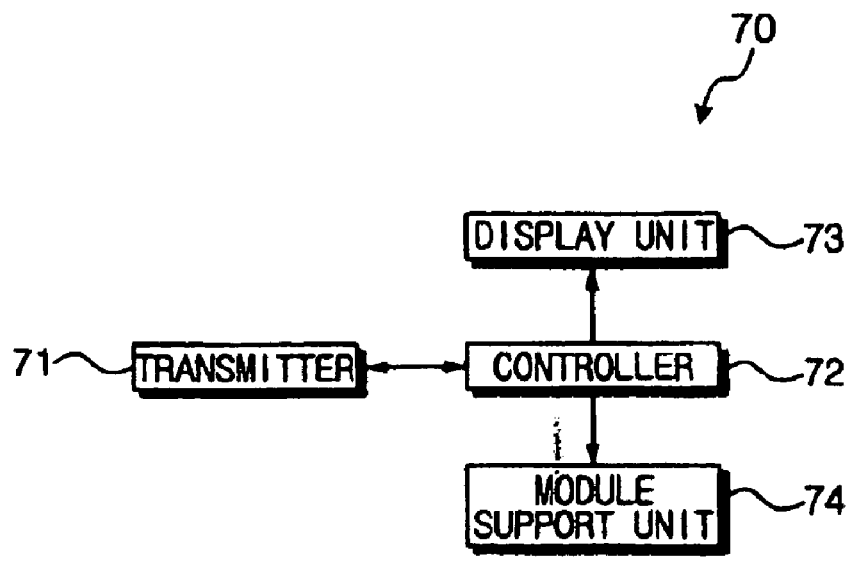
FIG. 6 is a block diagram showing a multichannel image driver of FIG. 5.

FIG. 6 is a block diagram showing the multichannel image driver of FIG, 5. As shown in FIG. 6, the multichannel image driver 70 comprises a transmitter 71, a controller 72, a display unit 73, and a module support unit 74. The transmitter 71 receives the signals transmitted from the multichannel image processor 30a or 30b through the communication device 58 and transmits the signals to be transmitted from the controller 72 to the multichannel image processor 30a or 30b through the communication unit 58.

The module support unit 74 comprises various operation modules for offering a main frame when the multichannel image driver 70 is operated and screens loaded in correspondence to the selected key, and for performing a function corresponding to an offered menu under the control of the controller 72. There are a system set-up window, a main frame, a succeeding frame, a separated image display window, a recorded memory capacity/remaining memory capacity calculate module of the memory 56 and a recordable time calculate module, as examples of the operation modules, and the above-mentioned modules are described later on. The display unit 73 displays information about an object to be displayed through the display device 54 under the control of the controller 72.

Hereinafter, the operation of the multichannel image driver 70 will be described in greater detail by using a screen offered when the multichannel image driver 70 is operated.

Figure 7:
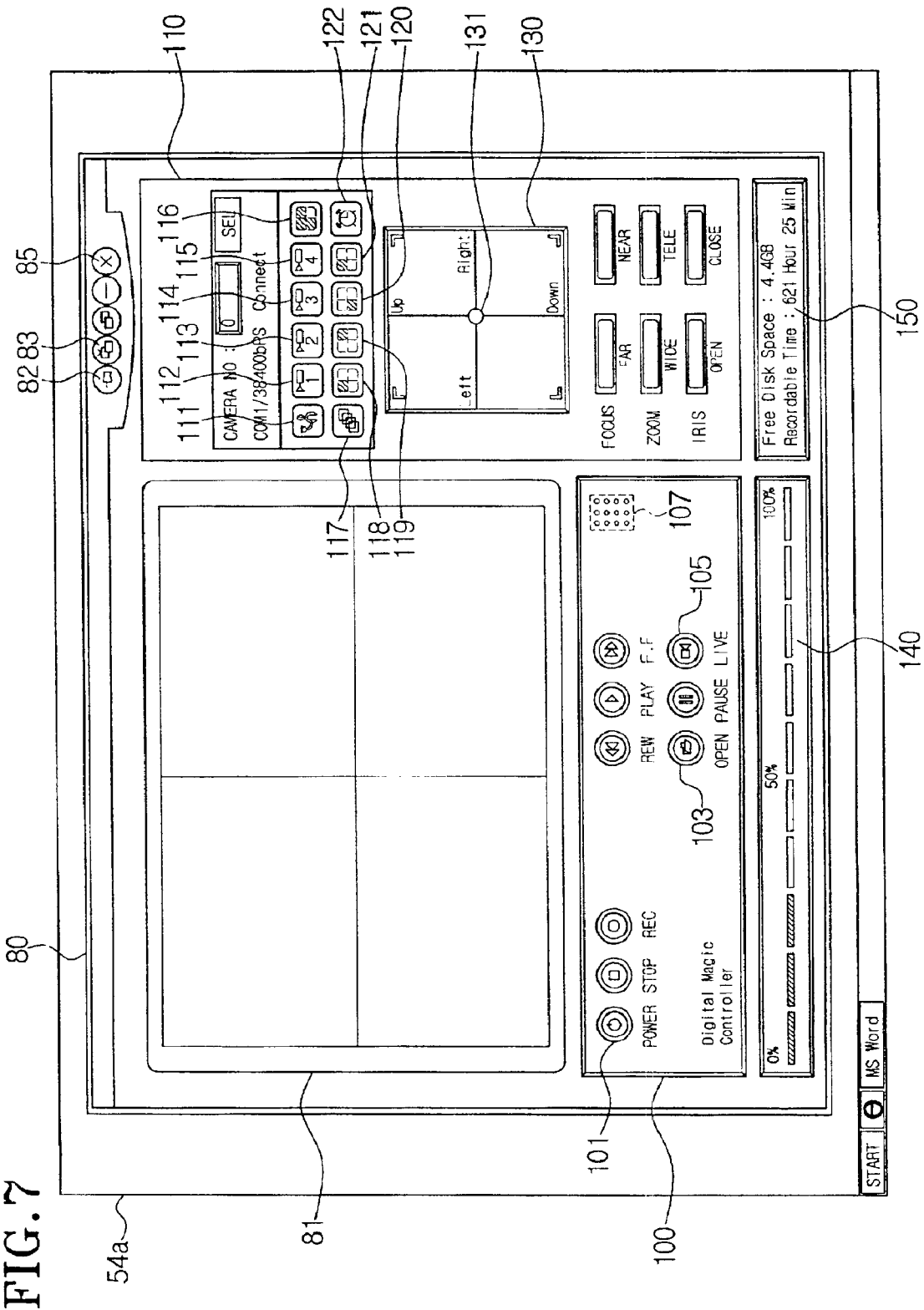
FIG. 7 is a view showing a main frame displayed by a multichannel image driver of FIG. 6 through a display device.

FIG. 7 is a view showing a main frame displayed by the multichannel image driver of FIG. 6 through a display device. The main frame is offered through the display device when the multichannel image driver 70 is operated. Referring to FIG. 7, the main frame 80 is displayed on a screen 54a of the display device 54. The main frame 80 comprises a main image display window 81, and a manipulation window 100, 110 having a plurality of keys displayed in regions plurally divided.

The main image display window 81 is a window for displaying transmitted image information as a four-divided screen or as one screen in accordance with a display mode. The manipulation window comprises a first key box 100 disposed at a lower end, and a second key box 110 disposed at a right side. The keys in the key boxes 100 and 110 are used to select features of the security system.

A power key 101, disposed in the first key box 100, is used when unloading the screen, which means finishing the operation. The power key 101 is a key for performing the same function as the close button illustrated at reference numeral 85, which is a familiar feature in the window system.

A stop key (STOP), a record key (REC), a rewind key (REW), a play key (PLAY), a fast forward key (F .F), and a pause key (PAUSE) are all well-known keys, and the description about the function of these keys will be omitted. The features associated with these keys are well known.

Figure 11:
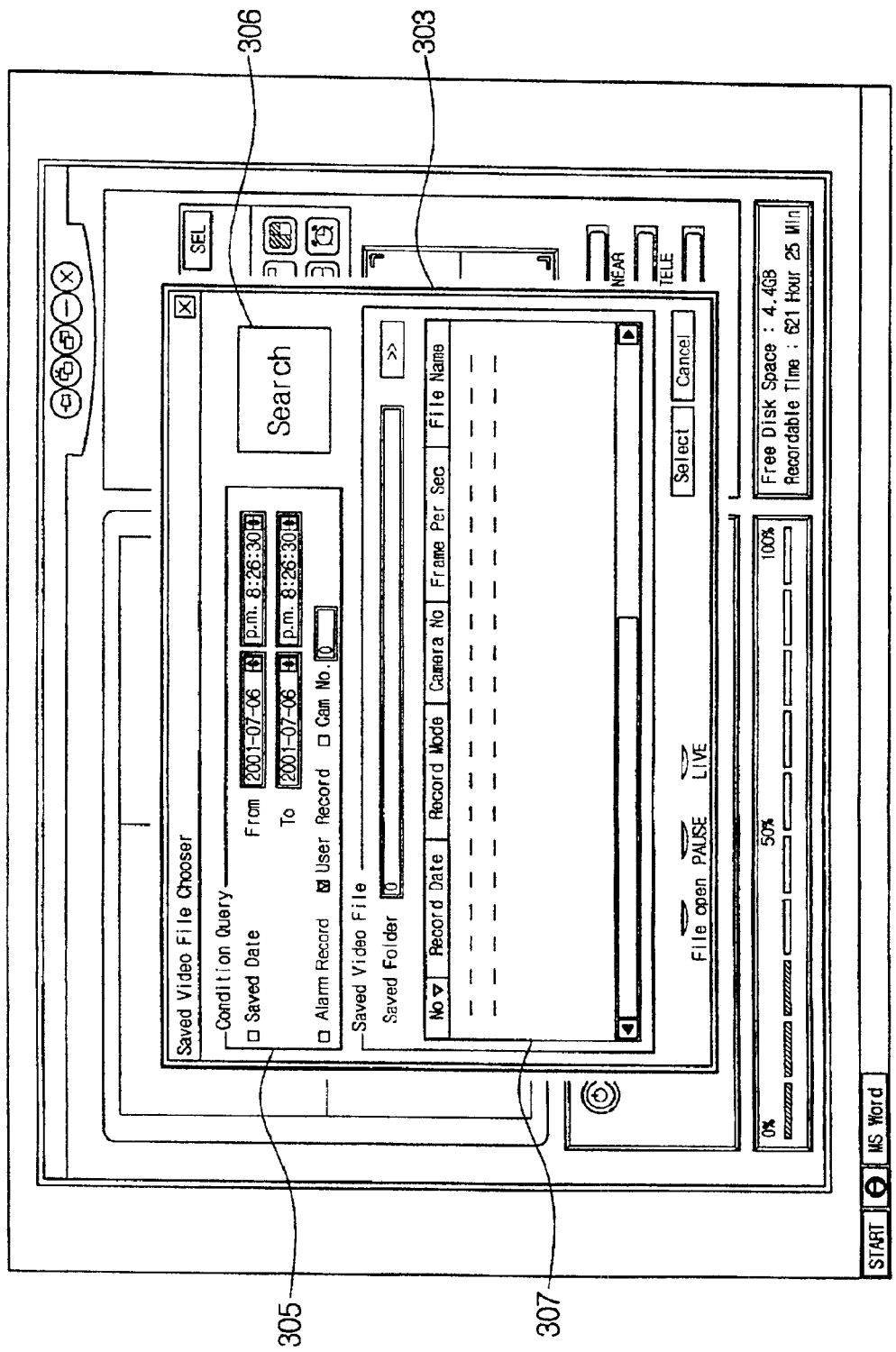
FIG. 11 is a view showing a module offered by being loaded when an open key of FIG. 7 is selected.

An open key (OPEN) 103 is a key to be used when reproducing a recorded file. When the open key 103 is selected, the controller 72 controls the module support unit 74 so that the desired file is easily selected, and loads a file select support window 303 as shown in FIG. 11. FIG. 11 is a view showing a module loaded and displayed when an open key of FIG. 7 is selected. The file select support window 303 offers a condition select menu 305, and a record file list display window 307 for listing the recorded files in accordance with a selecting condition.

The condition select menu 305 includes a menu for selecting the type of the recorded image file (an alarm record, a user record, and a camera number select window), and a menu for setting a date section of the image file that the user wants to find. The alarm record is an image file recorded when the alarm mode is operated, and the user record is an image file recorded when the user pushes a record key. The camera number select window is a window to be used when looking up recorded files only corresponding to the entered camera number.

A look-up key 306 searches files corresponding to the selected menu from the memory 56, and lists the searched files. The record file list display window 307 has a window for supporting search of a folder, and a window for listing the recorded file according to the selected condition. Preferably, the list offers information on the files corresponding to listed items such as a record date, a record mode (an alarm mode and a user mode), a camera number, a fps (frame per second) value, and a file name. The file name is automatically created when the user pushes the record key, or when recording for a predetermined time is automatically performed as a result of a determination of the alarm mode. Preferably, a file is named so that the user easily recognizes recording information, for example, the record date, the camera number, the record mode, and a coding method, etc., through the file name. For example, if an image of a camera number 5 recorded 2001 Jul. 4th p.m. 1 o'clock 47 minutes 14 seconds is a file of the first screen recorded as a Joint Photographic Experts Group (JPEG) method when the user selects the record key, the controller 72 creates the file name as 20010704134714_CAM05_user_01.MJPEG. In the above file name, for a file name recorded by the alarm mode, the part addressed as user is replaced by alarm, which shows that the file is recorded by the alarm mode.

According to the above method for creating, naming, and reading files of the multichannel image driver 70, the user can find an image that he/she wants to see without any difficulty, and the time for searching files will be decreased.

Referring back to FIG. 7, the second key box 110 has a window for inputting the number of a camera, and a key (SEL) for selecting when the user wants to see the image of the camera corresponding to the inputted camera number. If the SEL key is selected, the multichannel image driver 70 processes the image transmitted from the camera having the inputted number to be displayed on the main image display window as a full screen. Reference numeral 111 is a system set-up key.

Figure 8:
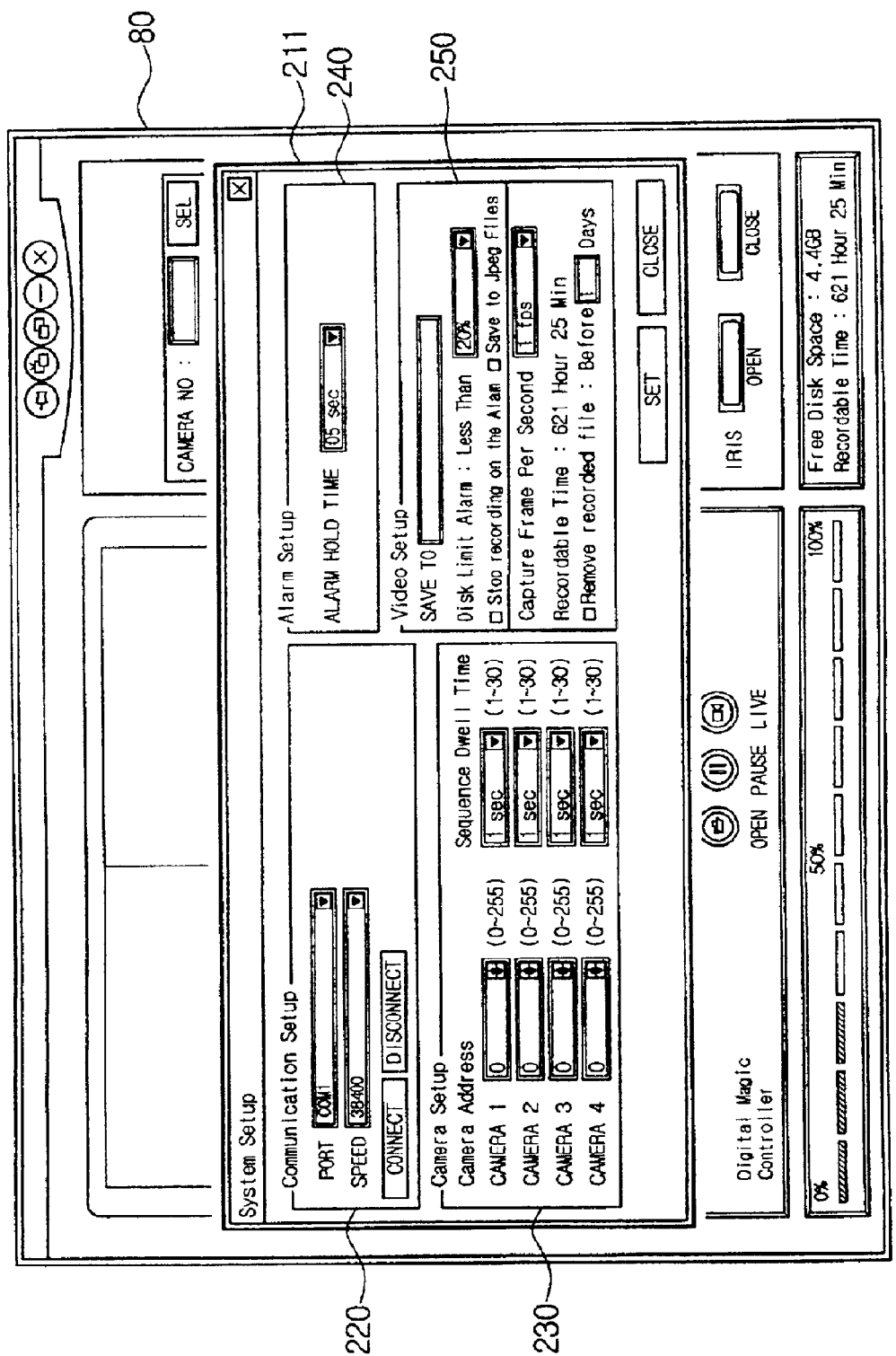
FIG. 8 is a view showing a set-up module window offered by being loaded when a system set-up key of FIG. 7 is selected.

FIG. 8 is a view showing a set-up module window which is loaded when a system set-up key of FIG. 7 is selected. FIG. 8 is a view showing a system set-up module window, which is loaded and supported by the module support unit 74 when the system set-up key ill is selected. As shown in FIG. 8, the system module set-up window 211 offers menus for selecting a communication set-up 220, a camera set-up 230, an alarm set-up 240, and a video set-up 250. The window 211 is displayed when the set-up mode is selected or requested. The set-up mode is selected or requested when the set-up key 111 is selected.

The communication set-up menu 220 offers a menu for setting up a port to communicate with the multichannel image processor 30. The camera set-up menu 230 offers a menu for setting up a camera having one number in the range from 0 to 255 among the plurality of cameras 20 connected to the input channels of the multichannel image processor 30. The camera set-up menu 230 offers a menu for setting up a sequence maintenance time for each channel adjustable in one-second increments, from one second to 30 seconds. The range of numbering of the cameras and selecting the sequence maintenance time is not limited to the above-mentioned preferred embodiment.

The alarm set-up menu 240 offers a menu for setting up an alarm mode operation time to consecutively record and display on the corresponding cameras 20, when an alarm signal is transmitted from the multichannel image processor 30.

The video set-up menu 250 offers a menu for setting up a directory to record the image displayed through the image display window 80, and a disk limit alarm item for setting up to alarm when the remaining capacity of the memory 56 reaches a certain percent of the entire capacity. The video set-up menu 250 also offers a menu for stopping the recording when the memory capacity reaches the capacity set through the disk limit alarm item, or for compressing and storing the image with a set-up coding method, for example, JPEG, wavelit, or Moving Picture Experts Group (MPEG).

As one example, the memory capacity consumed by time in accordance with the number of frames per second and the attribute of the image data with respect to the degree of movement, a National Television Standards Committee (NTSC) method and a phase alternating line (PAL) method are shown in FIG. 12A and FIG. 12B, wherein the coding method for the record is set up as the motion JPEG coding method. FIG. 12A is a view showing a memory capacity consumed when image data is recorded on a record device using the National Television Standards Committee (NTSC) method by the multichannel image driver of FIG. 6 for a transmitted image. FIG. 12B is a view showing the memory capacity consumed by time when image data is recorded on a record device using the phase alternating line (PAL) method by the multichannel image driver of FIG. 6 for the transmitted image.

The recordable time is provided so that the remaining capacity of the memory 56 can be calculated by setting up basic data for the memory capacity per frame based on the basic data.

In addition, the video set-up menu 250 has a window for setting up a frame capture rate per seconds for displaying a recordable time in the memory 56 when applying the present record rate, and for setting up the storing date of the recorded files.

Referring back to FIG. 7, if one key among four camera select keys located next to the system set-up key 111 is selected, the selected key processes the display mode for displaying the image of only the corresponding camera 20. Reference numeral 116 is a key for dividing the image display window 81 into four, and for displaying the image transmitted from four cameras 20 after dividing the image into four. Reference numeral 117 is a key for consecutively displaying the image signals as a full screen on the image display window 81 for the order of the cameras corresponding to the set-up pattern. Reference numerals 118 through 121 are keys for setting up a mode for displaying the image after freezing the image of the corresponding cameras in the four-divided display mode. In other words, if the reference numeral 119 is selected, the images of the camera numbers 1, 3, and 4 are consecutively displayed with respect to the transmission to the divided regions corresponding to the four-divided screens, and, in the image displaying region for the camera number 2 among the four-divided screens, the present image of the camera number 2 is frozen and continuously displayed. Reference numeral 122 is a key for use when lifting the alarm mode operated in accordance with the transmission of the alarm signal.

Reference numeral 130 is an azimuth marking window, and there is azimuth guide information such as up, down, right, and left displayed therein for guiding the photograph adjust direction based on a round point in the center.

A ball mark 131, indicated as a ball type at the round point in the azimuth mark window 130, is a photograph direction manipulation key, and if the key is not selected, the ball mark 131 is placed at the round point.

The multichannel image driver 70 displays the ball mark 131 in the azimuth mark window 130 by moving the ball mark 131 in accordance with the drag direction of the mouse 55a clicked to select the ball mark 131, and outputs a rotation control signal including a corresponding movement coordinate information for rotating a corresponding camera (selected by a key among the camera select keys such as 112 through 115 and the SEL key) in accordance with the direction of the movement to the corresponding camera 20 through the multichannel image processor 30.

When the click status of the mouse 55a is released, the ball mark 131 is returned to the round point. Therefore, the user can easily adjust the photograph direction of the cameras 20 by manipulating the mouse 55a. The ball mark 131 can be selected by placing the arrow associated with computer mouse 55a over the ball mark 131, and then pressing down the left mouse button 55c. Then, the ball mark 131 can be moved in the azimuth marking window 130 in a desired direction by moving the mouse 55a in a corresponding direction, with the left mouse button 55c continuously held down. Thus, the ball mark 131 is dragged in the desired direction. In this way, a camera's viewing direction can be easily modified. When the left mouse button 55c is released, the camera stops moving, and the ball mark 131 returns to the center of the azimuth marking window 130.

Keys disposed next to the names of focus, zoom, and iris are basic photograph manipulation keys, and these keys are for adjusting the focus, zoom, and iris as understood through the contents (such as far, near, wide, tele, open, and close) written under these keys.

The window associated with reference numeral 140 is a scale bar display window for displaying recorded capacity of the memory 56. The window associated with reference numeral 150 displays remaining memory capacity of the memory 56 and recordable time when recoding with the currently set-up record mode.

Figure 9:
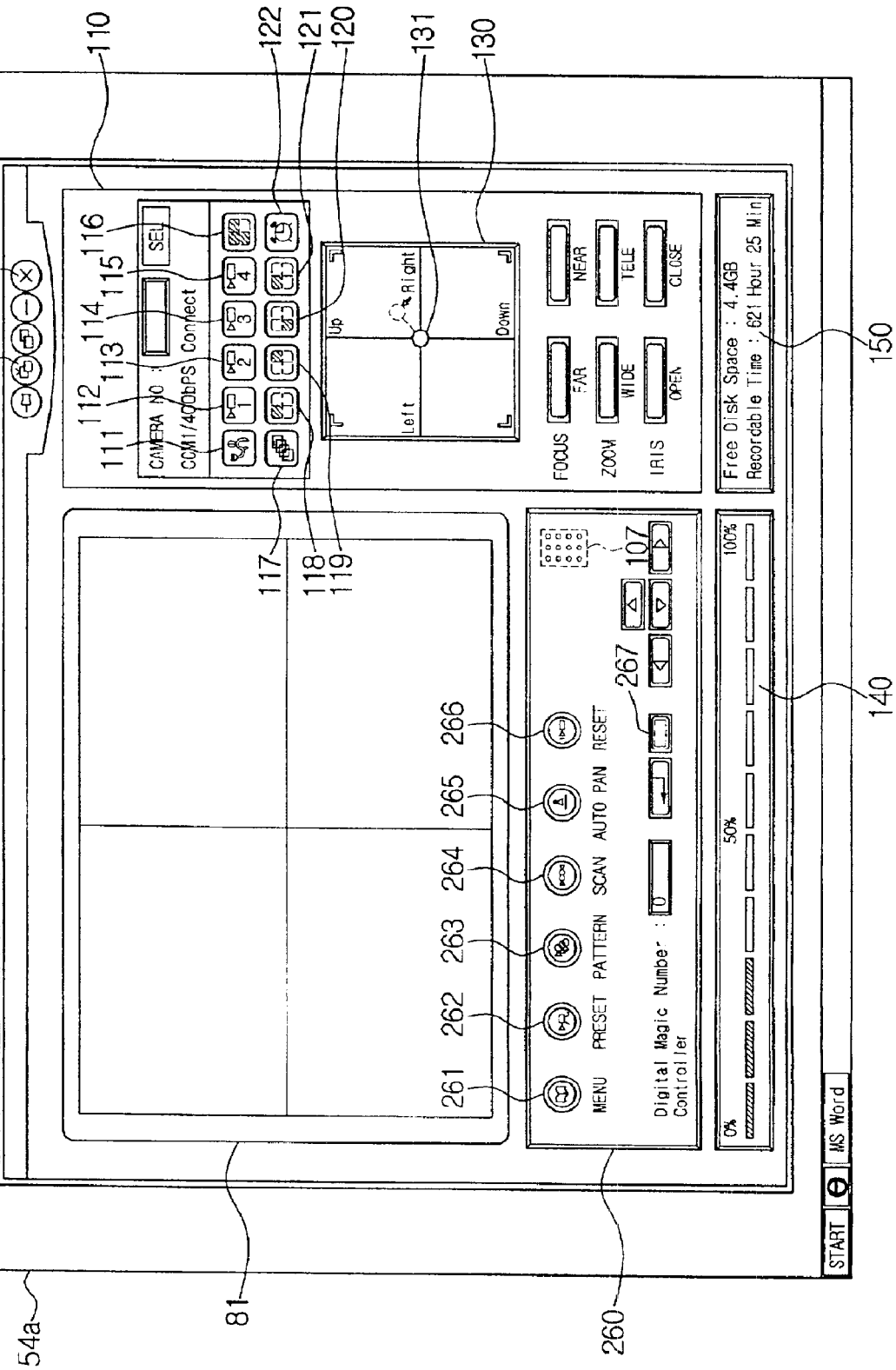
FIG. 9 is a view showing a succeeding frame offered when a next key of FIG. 7 is selected.

On the other hand, when the key associated with reference numeral 107 is selected, a succeeding frame is presented, as shown in FIG. 9. The key associated with reference numeral 107 is the next key 107. FIG. 9 is a view showing a succeeding frame offered when a next key 107 of FIG. 7 is selected. The elements having the same functions as the previous figures have been identified with the same reference numerals.

In FIG. 9, the first key box 100 is replaced by a third key box 260, and the rest of the elements are the same as those in the previous figures. The third key box 260 has a plurality of detailed photograph manipulation keys. The keys in the key box 260 are used to select features of the security system.

Let us suppose that main frame 80 and first key box 100 are displayed, as shown in FIG. 7. In this circumstance, if the "next" key 107 is selected, then main frame 80 is replaced by succeeding frame 180, and also first key box 100 is replaced by third key box 260 (as shown in FIG. 9).

If the next key 107 is pressed (selected) in a state when the frame 80 is being displayed, the frame 80 will no longer be displayed, and the frame 180 shall then be displayed. Likewise, if the next key 107 is selected in a state when the frame 180 is displayed, the frame 180 will no longer be displayed, and the frame 80 shall be displayed.

The third key box 260 is displayed in FIG. 9. The third key box 260 includes the menu key 261, the preset key 262, the pattern key 263, and other keys.

When a user selects the menu key 261 in the third key box 260, the screens that are loaded are: a screen for setting conditions about white balance, shutter speed, and motion detection function; a screen for setting a range of angle of auto pan; a screen allowing a user to give numbers to each of the regions divided with respect to the 360° of the azimuth angle and setting zoom in/out according to the numbers given to the regions (thus setting information required for execution of preset key 262 and scan key 264); and a screen for setting conditions corresponding to the execution of the sub-menu key.

When a user selects the preset key 262 in the third key box 260, there is no additional screen displayed. The number of the camera that wants the preset mode and the zoom in/out preset set-up number corresponding to a desired azimuth angle are selected after selecting the preset key 262. Then, by selecting an enter key, photographing is carried out according to the zoom in/out information set at the azimuth angle that corresponds to the selected preset set-up number.

When a user selects the pattern key 263 in the third key box 260, there is no additional screen displayed. The file name of a file corresponding to a desired operation pattern (selected from among stored patterns) is typed into the computer after selecting the pattern key 263. Then, by selecting the enter key, photographing is carried out according to the operation pattern that corresponds to that file name.

The user selects pattern information storage items from a setting screen that is provided through the manipulation of the menu key 261. While adjusting the camera through the basic manipulation keys, the adjustment information about the operational pattern of the camera is stored for a predetermined time period (30 seconds, for example). At the time of the storage, each item of the operational pattern information as stored is given a name that will identify the same from another. The user, therefore, uses the pattern key 263 when he/she wants to view the image that is taken by the camera repeatedly operated according to a certain one of the stored operational patterns.

As shown in FIGS. 7 and 9 of one preferred embodiment of the present invention, the keys in the second key box 110 are included in the main frame 80 and the next frame 180, the keys in the first key box 100 are included in the main frame 80, and the keys in the third key box 260 are included in the next frame 180. However, a window can also be designed such that the keys in the first, second, and third key boxes 100, 110, and 260 are all included in one frame, although the screen would become more complex.

If a menu key 261 is clicked, the menu key 261 sets up in advance what is needed to operate the functions of the detailed photograph manipulation keys that will be described later on. Preferably, the menu key 261 selects and sets up an identifier for each camera, white balance, shutter speed, and motion detection. If the menu key 261 is selected, a corresponding module program of the module support unit 74 is loaded.

The set-up item supported by the menu key 261 corresponds to the operation key, which will be described later on, and the set-up support will be explained using a key also described later on.

A preset key 262 is a key for selecting a mode for a photographing operation in accordance with preset set-up zoom in/out information. The preset set-up zoom in/out information is used by the photographing apparatus in order to photograph the region corresponding to one ordered number among the zoom in/out preset set-up information, which is set up after being selectively divided by giving numbers to each region plurally divided with respect to the azimuth angle. The preset set-up information can set up zoom in/out about the 128 regions plurally divided with respect to the azimuth angle by using the menu key 261 and a corresponding zoom in/out key. The set-up zoom in/out information can be described as set-up zoom information. The preset set-up zoom in/out information can be described as preset set-up zoom information.

If the user wants the camera to photograph with one preset set-up number among the preset set-up information, the user selects the preset key 262, inputs the preset set-up number into a number input window below, and then clicks an enter key (an arrow is indicated in a box) disposed beside. Then, the camera is controlled to photograph in the set up zoom in/out status with respect to the azimuth angle of the corresponding number.

A manipulation pattern key 263 is a key for operating the camera in accordance with a stored pattern for a certain manipulation of the basic photograph direction manipulation key. If a pattern memory is set up using the menu key 261, the manipulation pattern memory stores the pattern information about the manipulation of the basic photograph direction manipulation key for a predetermined time, e.g., 30 seconds. Preferably, whenever storing the manipulation pattern, the menu key 261 gives an identification number. In this case, as described before, after the manipulation pattern operation key 263 is selected, if an identification number of a desired manipulation pattern is entered, and the enter key is clicked, the camera is controlled so as to be operated in accordance with the stored manipulation pattern.

A scan key 264 is a key for commanding the sequential photographing of regions corresponding to the preset set-up information, according to ordered numbers, by using the menu key 261. In other words, when the preset ordered numbers are set up from 0 to 5, if the scan key 264 is selected, then the scan key 264 controls the camera to photograph the regions in a sequence corresponding to the ordered numbers from 0 to 5 by adjusting the zoom in accordance with the corresponding zoom information. The zoom information can be described as preset zoom in/out set-up information.

Each one of the ordered numbers corresponds to a region that can be photographed or viewed by at least one of the cameras. Thus, when the present invention is directed to sequentially photograph or view regions corresponding to ordered numbers 0 to 5, the following steps occur. First the region 0 is photographed/viewed, then region 1 is photographed/viewed, then region 2, then region 3, then region 4, etc.

An auto pan key 265 is a key for consecutively operating pan drive in the region of an auto pan angle set up by using the menu key 261. For example, if the auto pan key 265 is clicked, when the auto pan angle is set up for 0 to 90 degrees, then the pan drive is processed to consecutively operate only in the region of 0 to 90 degrees.

A reset key 266 is used to reset the set-up information. A block set-up key 267 sets up a desired block when partly detecting the movement of the image information displayed through the main image display window 81 after setting up the block for some region in the full screen. The set-up corresponding to the operation of the detailed photograph manipulation key is performed by using the menu key 261.

If a next key 107 is selected again, the main frame replaces the screen. On the other hand, since the main image display window 81 is offered for a fixed size, a separation key 83 is used when the user wants to enlarge or reduce the size of the image.

Figure 10:
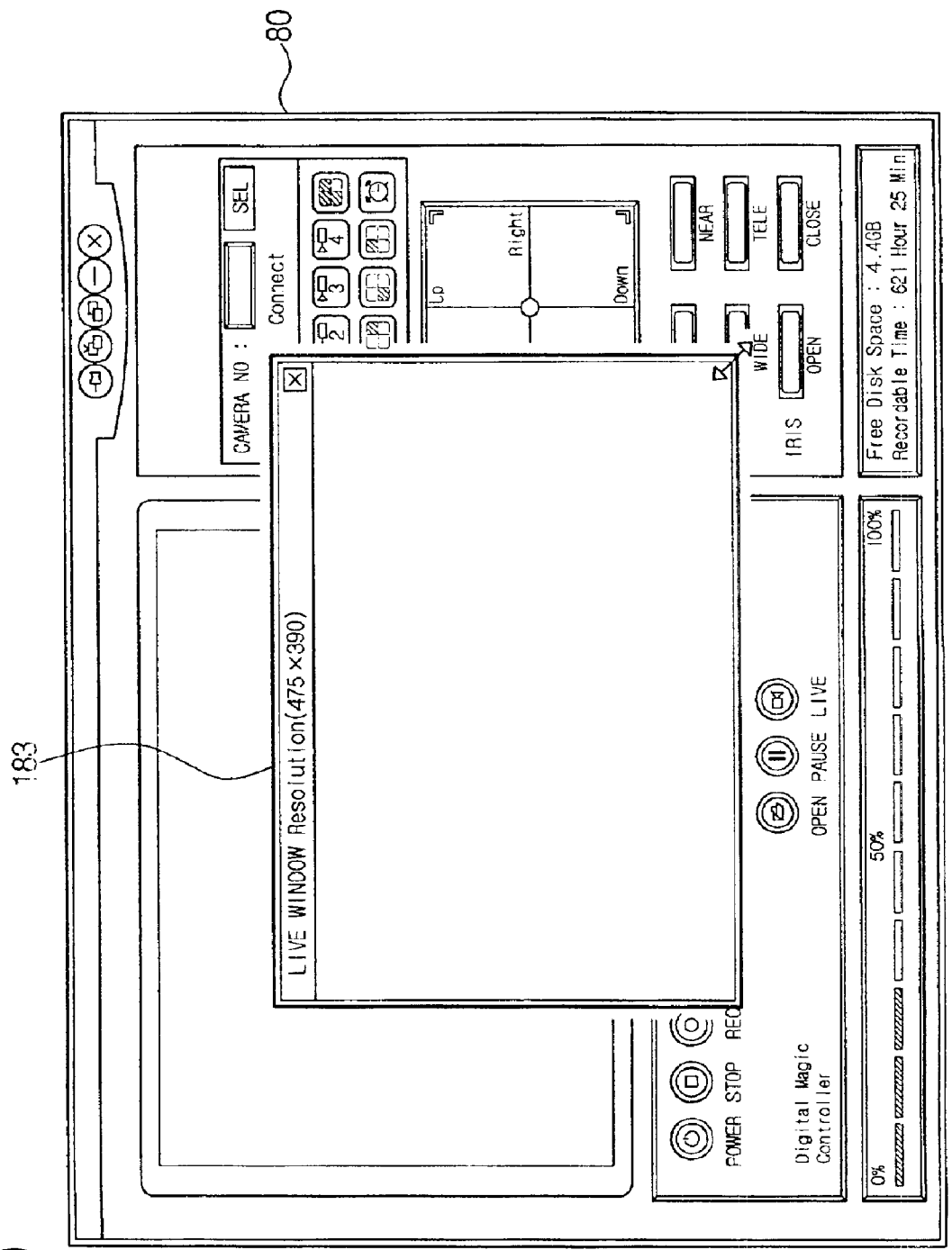
FIG. 10 is a view showing a size variable separated image display window offered when a separation key of FIGS. 7–9 is selected.

FIG. 10 is a view of a size variable separated image display window offered when the separation key of FIGS. 7–9 is selected. As shown in FIG. 10, if the separation key 83 is selected, a separated image display window 183 is loaded. If the user adjusts an edge of the window 183 by dragging or dropping the mouse 55a, then the size of the window 183 is adjusted, and the size of the image is also enlarged and reduced. At this point, the image is processed so as not to be displayed on the main image window 81.

The controller 72 operates so as to correspond to the manipulation of the keys described so far by controlling the module support unit 74, display unit 73, and transmitter 71 under the support of the operating system 57.

The multichannel image driver 70 can be loaded as an inactive window when the user wants to use a word processor by loading the document edit application program.

Furthermore, there is a key 82 for setting up for the loading position of the frames 80 and 180 currently activated by the multichannel image driver 70 when the user loads an application program besides the multichannel image driver 70. The following example is provided in order to further explain the key 82 shown in FIG. 7. Let us suppose that the key 82 is selected, and then a user executes a text editor program (such as notepad, wordpad, or Microsoft Word). Among the several windows that are open on the display screen of the computer, the upper-most window becomes the main frame 80, while the window immediately below the upper-most window becomes the window for the text editor program. Thus, the user can see all of the main frame 80, but can only see some parts of the text editor program window that are not hidden by the main frame 80. The key 82 relates to a window viewing method which enables a user to edit a document (or perform other tasks) while the security mode is performed as the main job.

As described so far, in the multichannel image processor 30 and the security system employing the same, a desired security system can be established if a record medium having the multichannel image driver 70 is installed in a computer 50, and the multichannel image processor 30 is connected between cameras 20 and the computer 50. Accordingly, the rate of utility for resources will be increased, separate work using the computer can be performed while watching an object, and the cameras can be remotely controlled.

Moreover, since the image information and the manipulating apparatuses are offered together on the display device of the computer 50 the user can watch or record desired image information by using an input device familiar to the user.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A security system, comprising:
a multichannel image processor for selectively receiving image signals transmitted through a plurality of input channels, and for outputting the image signals; and
a computer connected to said multichannel image processor through a communication interface, said computer having a multichannel image driver, said computer inputting the image signals outputted from said multichannel image processor;
the multichannel image driver controlling a selection of at least one of the input channels in accordance with a selected set-up mode, supplying a main image display window displaying the inputted image signals to a main frame of a display device, supplying at least one manipulation key window displaying keys to the main frame of the display device, processing in accordance with the selected set-up mode, performing at least one of displaying the inputted image signals through the display device in accordance with the selected set-up mode and recording the inputted image signals in a memory in accordance with the selected set-up mode, the displayed keys being used for selecting the selected set-up mode and other modes, said main image display window and said at least one manipulation key window being integrally displayed on the main frame of the display device;
said security system further comprising an alarm sensor for sensing an abnormality of an object to be watched, a main controller transmitting received information of an abnormality signal to the multichannel image driver when the abnormality signal is transmitted, and operating an alarm channel selection mode corresponding to the abnormality signal under control of the multichannel image driver.

2. The security system of claim 1, said multichannel image processor comprising:
a plurality of memories for storing signals inputted through the plurality of input channels, respectively;
a memory controller for selectively outputting the signals stored in the plurality of memories;
a coding unit for coding the signals outputted from the plurality of memories, and for transmitting the coded signals to said computer; and
a main controller for controlling said memory controller in accordance with a control signal transmitted from said computer.

3. The security system of claim 2, said multichannel image processor further comprising:
a plurality of analog-to-digital converters, each being disposed between a respective one of the plurality of input channels and a respective one of the plurality of memories, for converting the input signals into digital signals.

4. The security system of claim 3, said multichannel image processor further comprising a multiplexer for multiplexing the signals inputted through the plurality of input channels, and for outputting the multiplexed signals via a terminal for an external display unit.

5. The security system of claim 3, said multichannel image processor further comprising an RS-232 interface module connected to said main controller and carrying out data communication with said computer.

6. The security system of claim 5, said multichannel image processor further comprising an RS-485 interface module connected to said main controller and carrying out data communication with apparatuses connected to the plurality of input channels.

7. The security system of claim 5, said multichannel image processor further comprising a wireless transmitter connected to said main controller for wirelessly transmitting and receiving data to and from apparatuses connected to the plurality of input channels.

8. The security system of claim 1, the plurality of input channels receiving the image signals from a plurality of cameras, the abnormality signal corresponding to at least one selected camera selected from among the plurality of cameras, said at least one selected camera being in a region of said alarm sensor.

9. The security system of claim 8, the multichannel image driver recording and displaying image signals received from said at least one selected camera for a predetermined time when the abnormality signal is transmitted.

10. The security system of claim 1, further comprising at least one photographing device connected to the plurality of input channels, said at least one photographing device having a photograph direction which is changed in accordance with a control signal;
the multichannel image driver having basic photograph keys disposed on said at least one manipulation key window for manipulating functions supported by said at least one photographing device, and controlling said at least one photographing device through said multichannel image processor in accordance with manipulation of the basic photograph keys.

11. The security system of claim 10, the basic photograph keys including a focus adjust key, a zoom in/out adjust key, and a photograph direction manipulation key.

12. The security system of claim 1, said at least one manipulation key window including a system set-up key, the multichannel image driver loading a set-up module window supporting the set-up mode when the system set-up key is selected, the set-up module window including a window for selecting a directory for storing the received image signals in a memory of said computer and including an alarm capacity selection window for selecting a remaining capacity alarm target value to generate an alarm signal when a remaining memory capacity of the memory reaches the selected value.

13. The security system of claim 1, the main frame including a separation key, the separation key being selected to load a separated image window displaying a transmitted image separated from the main image display window, the multichannel image driver displaying the separated image window by loading a separated image window when the separation key is selected, the multichannel image driver adjusting a size of the separated image window and an image corresponding to the transmitted image when a signal is received from an input device to manipulate the size of the separated image window.

14. The security system of claim 1, said computer including a windows-based operating system supporting multitasking for operating an application program stored in a memory, the operation of the multichannel image driver being supported by the windows-based operating system.

15. A security system comprising:
a multichannel image processor for selectively receiving image signals transmitted through a plurality of input channels, and for outputting the image signals; and
a computer connected to said multichannel image processor through a communication interface, said computer having a multichannel image driver, said computer inputting the image signals outputted from said multichannel image processor;
the multichannel image driver controlling a selection of at least one of the input channels in accordance with a selected set-up mode, supplying a main image display window displaying the inputted image signals to a main frame of a display device, supplying at least one manipulation key window displaying keys to the main frame of the display device, processing in accordance with the selected set-up mode, performing at least one of displaying the inputted image signals through the display device in accordance with the selected set-up mode and recording the inputted image signals in a memory in accordance with the selected set-up mode, the displayed keys being used for selecting the selected set-up mode and other modes, said main image display window and said at least one manipulation key window being integrally displayed on the main frame of the display device;
said multichannel image driver having a photograph direction manipulation key displayed as a mark having a predetermined shape on an initial point in a direction display window displaying direction guide information guiding a photograph adjust direction when the photograph direction manipulation key is not selected; and
said multichannel image driver displaying the mark after moving the mark in the direction display window in accordance with a dragging direction of a computer mouse having a button pressed to select the mark, outputting a rotation control signal through said multichannel image processor to said at least one photographing device to rotate said at least one photographing device according to the moving of the mark, and showing the mark returning to the initial point when the pressed computer mouse button is released.

16. A security system comprising:
a multichannel image processor for selectively receiving image signals transmitted through a plurality of input channels, and for outputting the image signals; and
a computer connected to said multichannel image processor through a communication interface, said computer having a multichannel image driver, said computer inputting the image signals outputted from said multichannel image processor;
the multichannel image driver controlling a selection of at least one of the input channels in accordance with a selected set-up mode, supplying a main image display window displaying the inputted image signals to a main frame of a display device, supplying at least one manipulation key window displaying keys to the main frame of the display device, processing in accordance with the selected set-up mode, performing at least one of displaying the inputted image signals through the display device in accordance with the selected set-up mode and recording the inputted image signals in a memory in accordance with the selected set-up mode, the displayed keys being used for selecting the selected set-up mode and other modes, said main image display window and said at least one manipulation key window being integrally displayed on the main frame of the display device;
the multichannel image driver having a next key, the next key being selected to display a succeeding frames and at least one detailed photograph key for adjusting and setting up a detailed function including a photographing pattern of at least one photographing device, said at least one detailed photograph key being displayed in said at least one manipulation key window;
the multichannel image driver loading and displaying the succeeding frame on the display device and processing a function corresponding to a selected key from among said at least one detailed photograph key when the next key is selected.

17. The security system of claim 16, said at least one detailed photograph key including menu keys for selecting and setting up an identifier for said at least one photographing device, a white balance, a shutter speed, and motion detection.

18. The security system of claim 16, said at least one detailed photograph key including a preset key for selecting a preset mode, said at least one photographing device operating in the preset mode in accordance with preset zoom set-up information for a region corresponding to an ordered number selected from among ordered numbers of the preset zoom set-up information, the preset zoom set-up information being classified selectively by assigning respective ordered numbers and corresponding zoom set-up information to respective detailed regions according to an azimuth angle, said at least one detailed photograph key including a manipulation pattern operation key for operating said at least one photographing device in accordance with stored information about manipulation of a photograph direction manipulation key, said at least one detailed photograph key including a scan key for operating said at least one photographing device to sequentially photograph in accordance with the ordered numbers of the preset zoom set-up information.

19. The security system of claim 18, said at least one detailed photograph key including an auto pan key for driving a pan within a set-up pan angle, and including a block set-up key for selecting a region viewed by said at least one photographic device, the region being selected by appointing a block for the region in the image display window.

20. The security system of claim 19, movement being detected in the selected region.

21. The security system of claim 1, further comprising a memory capacity display window disposed at a side of the main frame to display a memory capacity, the multichannel image driver calculating remaining memory capacity of said computer and displaying the remaining memory capacity through the memory capacity display window.

22. A multichannel image processor, comprising:
a plurality of input channels for receiving image signals transmitted from a plurality of cameras;
a plurality of memories for storing the image signals received by said plurality of input channels;
a memory controller for selectively outputting the image signals stored in said plurality of memories in accordance with a control signal;
a coding unit for coding signals outputted from said plurality of memories, and for transmitting the coded signals through an image output terminal for a computer;
a main controller for controlling said memory controller in accordance with the control signal, the control signal being transmitted from the computer through a computer data communication terminal; and
an alarm sensor for sensing an abnormality of a selected object, the object being selected to be watched;
said main controller transmitting first abnormality signal data through the computer data communication terminal and said main controller operating an alarm channel selection mode corresponding to a generation of the abnormality signal in accordance with a reply control signal received through the computer data communication terminal in response to the first abnormality signal data when the abnormality signal is transmitted from said alarm sensor.

23. The multichannel image processor of claim 22, further comprising:
a plurality of analog-to-digital converters, each being disposed between a respective one of said plurality of input channels and a respective one of said plurality of memories to convert the received image signals to digital signals.

24. The multichannel image processor of claim 23, further comprising:
a multiplexer for multiplexing and outputting the image signals received by said plurality of input channels through a terminal for an external display device, the terminal for the external display device being distinguishable from the computer data communication terminal.

25. The multichannel image processor of claim 23, further comprising:
an RS-232 interface module disposed between the computer data communication terminal and said main controller to carry out data communication with the computer.

26. The multichannel image processor of claim 25, further comprising:
an RS-485 interface module connected between said main controller and a terminal for camera communication for carrying out data communication with at least one of the plurality of cameras.

27. The multichannel image processor of claim 25, further comprising:
a wireless transmitter connected to said main controller for wirelessly communicating with at least one of the plurality of cameras.

28. A computer storage medium having stored thereon a set of instructions for implementing a method, said set of instructions comprising at least one instruction for:
selectively receiving image signals transmitted through a plurality of input channels and outputting the image signals; and
controlling a selection of at least one of the input channels in accordance with a selected set-up mode, displaying the outputted image signals in a main image display window of a display device of a computer in accordance with the selected set-up mode, displaying signals stored in a memory, supplying at least one manipulation key window displaying keys for selecting the set-up mode and other modes, and controlling said selective receiving of the image signals in accordance with the selected set-up mode, the main image display window and the manipulation key window being integrally displayed on a main frame of the display device;
said set of instructions further comprising at least one instruction for:
displaying a photograph direction manipulation key as a mark having a predetermined share on an initial point in a direction display window displaying direction guide information guiding a photograph adjust direction when the photograph direction manipulation key is not selected; and
displaying the mark after moving the mark in the direction display window in accordance with a dragging direction of a computer mouse having a clicked button pressed to select the mark, outputting a rotation control signal to said at least one photographing device to rotate said at least one photographing device according to the moving direction, and showing the mark returning to the initial point when the computer mouse clicked button is released.

29. The computer storage medium of claim 28, said set of instructions further comprising at least one instruction for:
transmitting the image signals from at least one photographing device to the plurality of input channels, said at least one photographing device having a photograph direction changed in accordance with a control signal, the keys displayed by said at least one manipulation key window including basic photograph keys for manipulation functions supported by said at least one photographing device; and
controlling said at least one photographing device in accordance with the manipulation of the basic photograph keys.

30. The computer storage medium of claim 29, the basic photograph keys including a focus adjust key, a zoom adjust key, and the photograph direction manipulation key.

31. A computer storage medium having stored thereon a set of instructions for implementing a method, said set of instructions comprising at least one instruction for:
selectively receiving image signals transmitted through a plurality of input channels and outputting the image signals; and controlling a selection of at least one of the input channels in accordance with a selected set-up mode, displaying the outputted image signals in a main image display window of a display device of a computer in accordance with the selected set-up mode, displaying signals stored in a memory, supplying at least one manipulation key window displaying keys for selecting the set-up mode and other modes, and controlling said selective receiving of the image signals in accordance with the selected set-up mode, the main image display window and the manipulation key window being integrally displayed on a main frame of the display device;

said set of instructions further comprising at least one instruction for:

displaying a next key, the next key being selected to display a succeeding frame and at least one detailed photograph key for adjusting and setting up a detailed function including a photographing pattern of said at least one photographing device, said at least one detailed photograph key being displayed in said at least one manipulation key window, and when the next key is selected, loading and displaying the succeeding frame on the display device and processing a function corresponding to a first detailed key selected from among said at least one detailed photograph key.

32. The computer storage medium of claim 31, said at least one detailed photograph key including menu keys for selecting and setting up an identifier for said at least one photographing device, a white balance, a setter speed, and motion detection.

33. The computer storage medium of claim 31, said at least one detailed photograph key including a preset key for selecting a preset mode, said at least one photographing device operating in the preset mode in accordance with preset zoom set-up information for a region corresponding to an ordered number selected from among ordered numbers of the preset zoom set-up information, the preset zoom set-up information being classified selectively by assigning respective ordered numbers and corresponding zoom set-up information to respective detailed regions according to an azimuth angle, said at least one detailed photograph key including a manipulation pattern operation key for operating said at least one photographing device in accordance with stored information about manipulation of the photograph direction manipulation key, said at least one detailed photograph key including a scan key for operating said at least one photographing device to sequentially photograph in accordance with the ordered numbers of the preset zoom set-up information.

34. The computer storage medium of claim 33, said at least one detailed photograph key including an auto pan key for driving a pan within a set-up pan angle, and including a block set-up key for selecting a region viewed by said at least one photographic device, the region being selected by appointing a block for the region in the image display window.

* * * * *